United States Patent
Itakura et al.

(10) Patent No.: US 8,269,922 B2
(45) Date of Patent: Sep. 18, 2012

(54) LIQUID CRYSTAL DISPLAY DEVICE

(75) Inventors: Shimon Itakura, Mobara (JP);
Fumihiko Hieda, Oamishirasato (JP);
Makoto Fujimoto, Mobara (JP)

(73) Assignees: Hitachi Displays, Ltd., Chiba (JP);
Panasonic Liquid Crystal Display Co., Ltd., Hyogo (JP)

( * ) Notice: Subject to any disclaimer, the term of this patent is extended or adjusted under 35 U.S.C. 154(b) by 190 days.

(21) Appl. No.: 12/883,514

(22) Filed: Sep. 16, 2010

(65) Prior Publication Data

US 2011/0075066 A1  Mar. 31, 2011

(30) Foreign Application Priority Data

Sep. 29, 2009 (JP) .................. 2009-223728

(51) Int. Cl.
*G02F 1/1335* (2006.01)
*G02F 1/1333* (2006.01)

(52) U.S. Cl. ............... 349/70; 349/58; 349/67

(58) Field of Classification Search ............... 349/70
See application file for complete search history.

(56) References Cited

U.S. PATENT DOCUMENTS

| | | | | |
|---|---|---|---|---|
| 5,089,943 A * | 2/1992 | Wolfelschneider | ........... | 362/216 |
| 5,262,880 A * | 11/1993 | Abileah | ................. | 349/64 |
| 5,726,722 A * | 3/1998 | Uehara et al. | .................. | 349/66 |
| 7,384,169 B2 * | 6/2008 | Wada et al. | ................... | 362/223 |
| 7,538,833 B2 * | 5/2009 | Azuma et al. | .................. | 349/61 |
| 7,559,686 B2 * | 7/2009 | Chang et al. | ................. | 362/652 |
| 7,701,528 B2 * | 4/2010 | Azuma et al. | .................. | 349/58 |
| 7,884,894 B2 * | 2/2011 | Cho et al. | ....................... | 349/58 |
| 7,905,615 B2 * | 3/2011 | Abo et al. | ..................... | 362/97.1 |
| 7,944,518 B2 * | 5/2011 | Tsubokura et al. | ............. | 349/58 |
| 8,085,361 B2 * | 12/2011 | Sudo | ................. | 349/70 |
| 8,164,712 B2 * | 4/2012 | Sekiguchi et al. | .............. | 349/70 |
| 2005/0062899 A1 * | 3/2005 | Fukayama et al. | .............. | 349/58 |
| 2005/0219861 A1 * | 10/2005 | Oka | .............................. | 362/614 |
| 2006/0044779 A1 * | 3/2006 | Lee | ................. | 362/29 |
| 2006/0044780 A1 * | 3/2006 | Kim | ................. | 362/29 |
| 2008/0049167 A1 * | 2/2008 | Abo et al. | ..................... | 349/64 |
| 2008/0143919 A1 * | 6/2008 | Azuma et al. | .................. | 349/58 |
| 2008/0204628 A1 * | 8/2008 | Azuma et al. | .................. | 349/61 |
| 2008/0211994 A1 * | 9/2008 | Moon | ............................ | 349/71 |
| 2008/0225198 A1 * | 9/2008 | Azuma et al. | .................. | 349/58 |
| 2008/0231775 A1 * | 9/2008 | Lee | ................. | 349/68 |
| 2009/0059113 A1 * | 3/2009 | Tsubokura et al. | ............. | 349/58 |
| 2009/0086121 A1 * | 4/2009 | Sekiguchi et al. | .............. | 349/58 |
| 2009/0109374 A1 * | 4/2009 | Tsubokura et al. | ............. | 349/70 |
| 2009/0190066 A1 | 7/2009 | Sudo | | |
| 2009/0256990 A1 * | 10/2009 | Azuma et al. | .................. | 349/58 |
| 2010/0046206 A1 * | 2/2010 | Kawada | ...................... | 362/97.2 |
| 2010/0283937 A1 * | 11/2010 | Takeba | ............................ | 349/61 |
| 2011/0075066 A1 * | 3/2011 | Itakura et al. | ................... | 349/62 |

FOREIGN PATENT DOCUMENTS

JP  2009-175377  8/2009

* cited by examiner

*Primary Examiner* — Rhonda Peace

(74) *Attorney, Agent, or Firm* — Antonelli, Terry, Stout & Kraus, LLP.

(57) ABSTRACT

Provided is a liquid crystal display device including: a liquid crystal display panel; a fluorescent tube disposed on a side opposite to a display surface of the liquid crystal display panel; an electrode holder for retaining the fluorescent tube; a frame to which the electrode holder is attached; a light reflection cover including one of a hole and a notch for allowing the fluorescent tube to pass therethrough, the light reflection cover covering a part of the fluorescent tube and an area of the frame on an outer side of the fluorescent tube; and an elastic body provided on the light reflection cover so as to face the fluorescent tube in a non-contact manner.

8 Claims, 6 Drawing Sheets

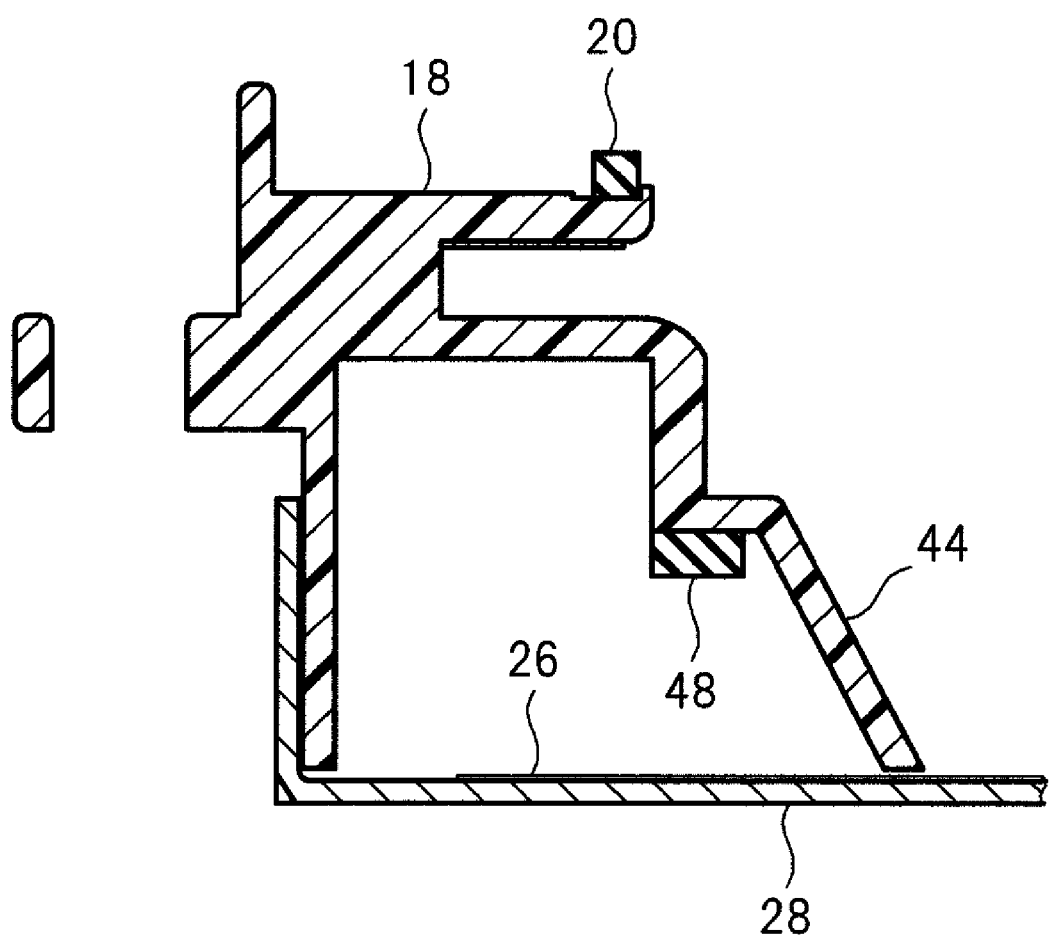

LIQUID CRYSTAL DISPLAY DEVICE

CROSS-REFERENCE TO RELATED APPLICATION

The present application claims priority from Japanese application JP 2009-223728 filed on Sep. 29, 2009, the content of which is hereby incorporated by reference into this application.

BACKGROUND OF THE INVENTION

1. Field of the Invention

The present invention relates to a liquid crystal display device.

2. Description of the Related Art

It is known that a fluorescent tube is used as a backlight of a liquid crystal display device (see Japanese Patent Application Laid-open No. 2009-175377 (related U.S. patent application: Publication No. US2009/0190066)). The fluorescent tube serves as a light source that converts ultraviolet rays generated through electric discharges into visible light beams by irradiating phosphors with the ultraviolet rays. Specifically, electrons released by the discharge collide with mercury atoms. Then, the mercury atoms receive energy from the electrons, and thus the ultraviolet rays are generated. The ultraviolet rays generated in this manner excite the phosphors applied to a wall surface of the fluorescent tube, and thus light is emitted. In order that the fluorescent tube may emit light uniformly, it is desirable that the mercury atoms be dispersed uniformly therein.

Conventionally, in a so-called direct backlight type liquid crystal display device in which a backlight is disposed on a rear surface side of a liquid crystal display panel, the fluorescent tube is retained by holders (also referred to as pin molds) at portions other than end portions of the fluorescent tube. The holders are fixed to a frame formed of a metal. Therefore, heat of the fluorescent tube easily transfers to the frame via the holders, and hence the portions of the fluorescent tube retained by the holders easily decrease in temperature. As a result, temperature distribution may be generated in the fluorescent tube, and due to different temperatures in the temperature distribution, the dispersion of the mercury atoms may become unequal. This may interfere with uniform light emission.

The holders retain the fluorescent tube at a plurality of portions, and hence reducing the number of the holders may prevent generation of the temperature distribution. However, if the number of the holders is reduced, vibration amplitude of the fluorescent tube may increase due to influence of an impact during transportation or the like. In this situation, the fluorescent tube may be broken due to collision with other members, and therefore measures to prevent the breakage are required to be provided.

SUMMARY OF THE INVENTION

The present invention has an object to provide a direct backlight type liquid crystal display device capable of preventing breakage of a fluorescent tube due to collision with other members.

(1) A liquid crystal display device according to the present invention includes: a liquid crystal display panel; a fluorescent tube disposed on a side opposite to a display surface of the liquid crystal display panel; a holder for retaining the fluorescent tube; a frame to which the holder is attached; a light reflection cover disposed between the liquid crystal display panel and the frame, the light reflection cover including one of a hole and a notch for allowing the fluorescent tube to pass therethrough, the light reflection cover covering a part of the fluorescent tube; and an elastic body provided on the light reflection cover so as to face the fluorescent tube in a non-contact manner. According to the present invention, the elastic body is provided between the light reflection cover and the fluorescent tube, and hence the fluorescent tube may be prevented from being broken due to collision with the light reflection cover.

(2) In the liquid crystal display device described in Item (1), the fluorescent tube may include: a first linear portion and a second linear portion arranged in parallel with each other; and a connection portion for connecting one end portion of the first linear portion and one end portion of the second linear portion. The connection portion may include at least one curved portion which is adjacent to the first linear portion and the second linear portion. The at least one curved portion, a part of the first linear portion, a part of the second linear portion, and the connection portion may be covered with the light reflection cover. The elastic body may be located at a position facing the part of the first linear portion and the part of the second linear portion.

(3) In the liquid crystal display device described in Item (1), the light reflection cover may include a step portion having a plane in parallel with the frame, and the elastic body may be attached to the step portion.

(4) The liquid crystal display device described in Item (1) may further include an intermediate frame disposed between the liquid crystal display panel and the frame, for disposing the liquid crystal display panel thereon, and the intermediate frame may be integrally formed with the light reflection cover.

(5) In the liquid crystal display device described in Item (4), the intermediate frame and the light reflection cover may both be formed of a white resin.

BRIEF DESCRIPTION OF THE DRAWINGS

In the accompanying drawings:

FIG. 6 is a cross sectional view taken along the line VI-VI of the structure illustrated in FIG. 3.

DETAILED DESCRIPTION OF THE INVENTION

Figure 1:
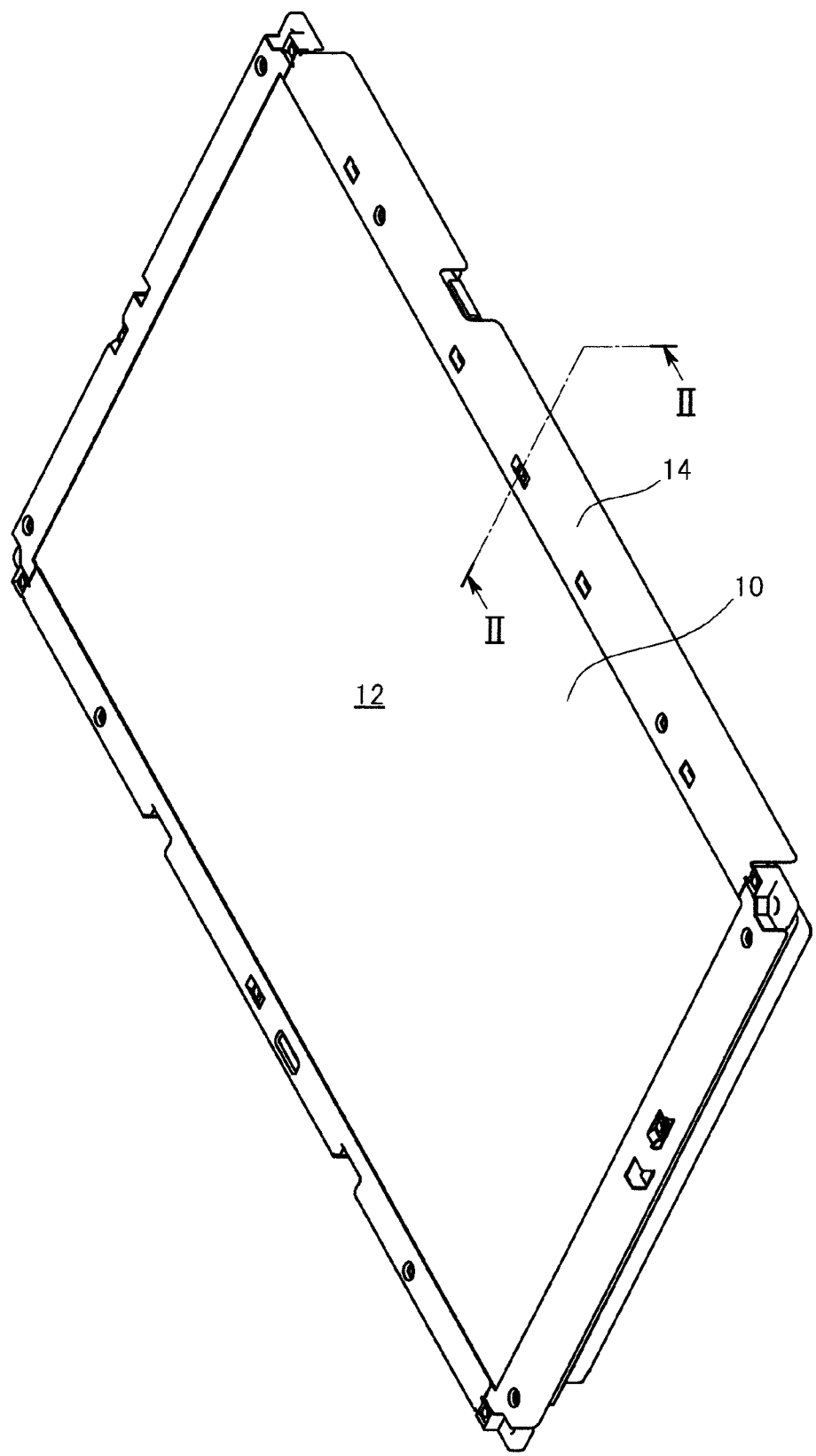
FIG. 1 is a perspective view illustrating a liquid crystal display device according to an embodiment of the present invention.
Figure 2:
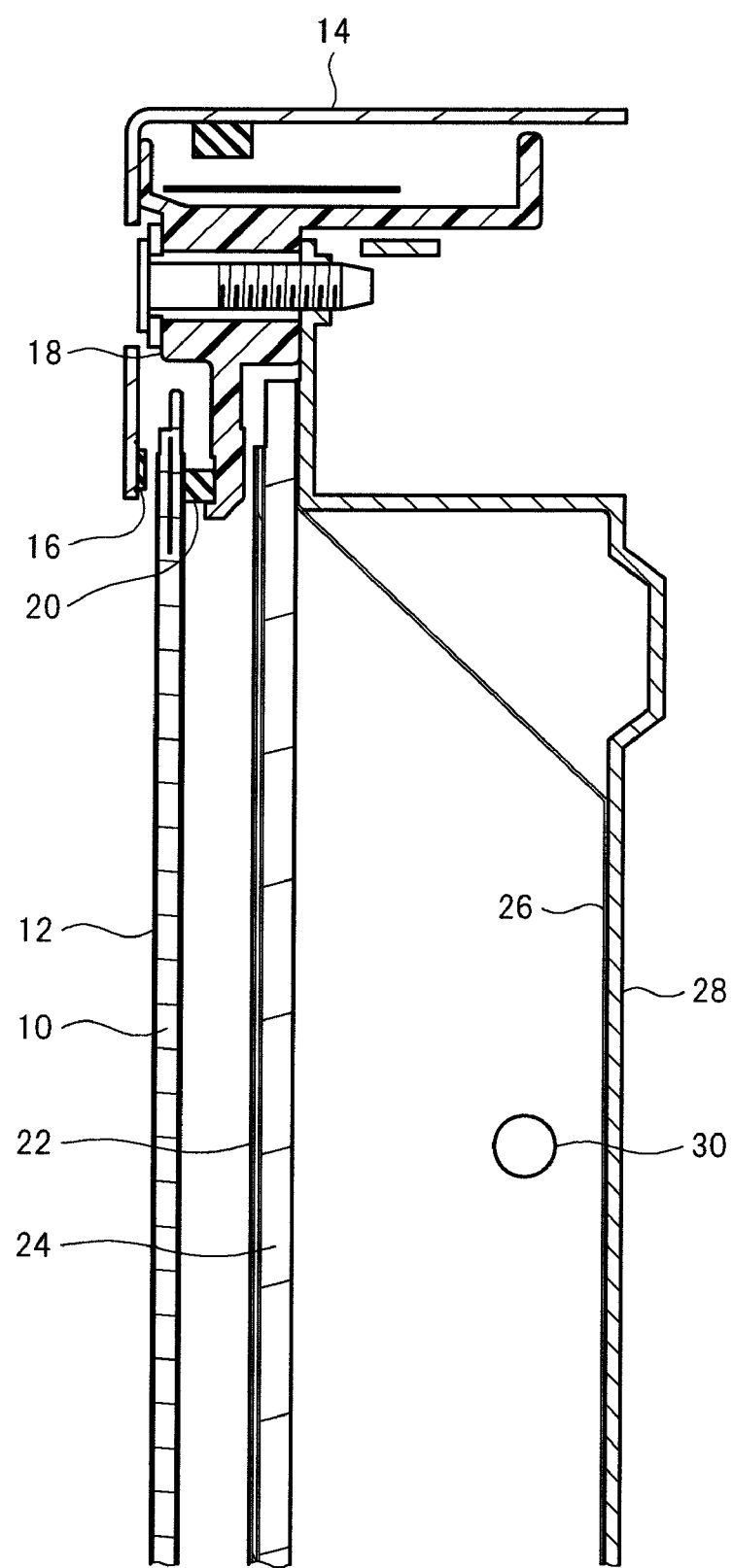
FIG. 2 is an enlarged view of a section of the liquid crystal display device taken along the line II-II of FIG. 1.

Hereinafter, an embodiment of the present invention is described with reference to the accompanying drawings. FIG. 1 is a perspective view illustrating a liquid crystal display device according to the embodiment of the present invention. FIG. 2 is an enlarged view of a section of the liquid crystal display device taken along the line II-II of FIG. 1.

The liquid crystal display device includes a liquid crystal display panel 10. A drive mode of the liquid crystal display panel 10 may be any mode such as an in-plane switching (IPS) mode, a twisted nematic (TN) mode, or a vertical alignment (VA) mode. Electrodes and wirings according to the mode are formed thereon.

A part of an upper frame 14 is faced to a peripheral edge portion of the liquid crystal display panel 10 on a display surface 12 (front surface) side. Therefore, the liquid crystal display panel 10 is prevented from being separated. The upper frame 14 is formed by assembling bar members in a rectangular shape. Each of the bar members has an L-shaped cross section as illustrated in FIG. 2. The upper frame 14 is formed of a metal. A first elastic body 16 is provided on the upper frame 14 so as to face the liquid crystal display panel 10. Because the first elastic body 16 is interposed between the liquid crystal display panel 10 and the upper frame 14, direct contact therebetween is prevented.

A part of an intermediate frame 18 is faced to the peripheral edge portion of the liquid crystal display panel 10 on a side opposite to the display surface 12 (rear surface side). A second elastic body 20 is provided on the intermediate frame 18 so as to face the liquid crystal display panel 10. Because the second elastic body 20 is interposed between the liquid crystal display panel 10 and the intermediate frame 18, direct contact therebetween is prevented. A gap between the first elastic body 16 and the second elastic body 20 is larger than a thickness of the liquid crystal display panel 10. Therefore, the liquid crystal display panel 10 is not fixed by the first elastic body 16 and the second elastic body 20, but movable in a direction perpendicular to the display surface 12.

A diffusion sheet 22 and a diffusion plate 24 are disposed on the rear surface side of the liquid crystal display panel 10 so as to overlap with the liquid crystal display panel 10. In addition, a reflection sheet 26 is disposed on a side opposite to the liquid crystal display panel 10 of the diffusion plate 24.

The liquid crystal display device includes a lower frame 28 formed of a metal. Rear surface sides of the liquid crystal display panel 10, the diffusion sheet 22, the diffusion plate 24, and the reflection sheet 26 are covered with the lower frame 28. The intermediate frame 18 is disposed on a peripheral end portion of the lower frame 28, and the intermediate frame 18 is sandwiched between the upper frame 14 and the lower frame 28. Peripheral end portions of the diffusion sheet 22, the diffusion plate 24, and the reflection sheet 26 are disposed between the peripheral end portion of the lower frame 28 and the intermediate frame 18.

Figure 3:
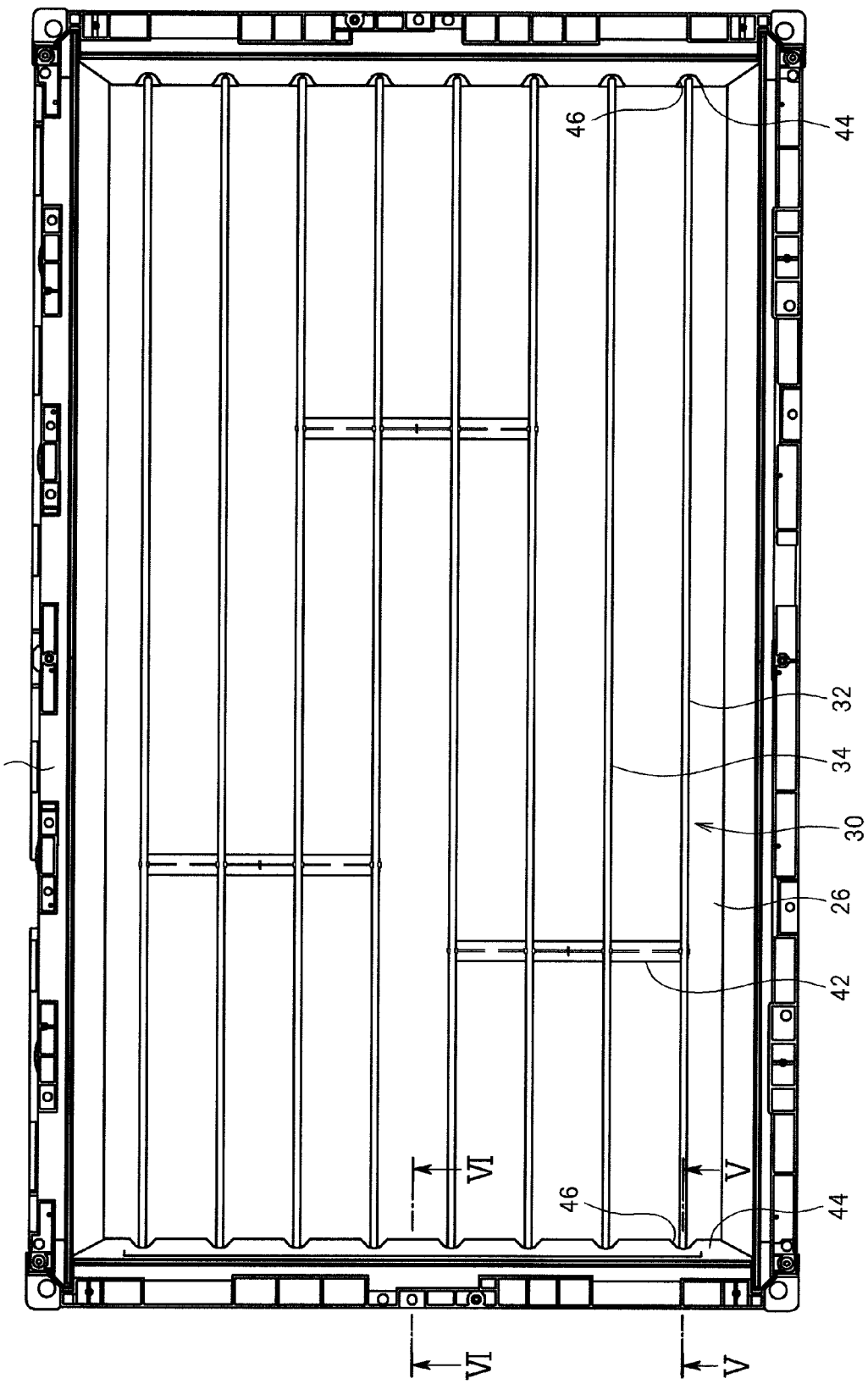
FIG. 3 is a plan view illustrating a structure in which an upper frame, a liquid crystal display panel, a diffusion sheet, and a diffusion plate are detached from the liquid crystal display device of FIG. 1.
Figure 4:
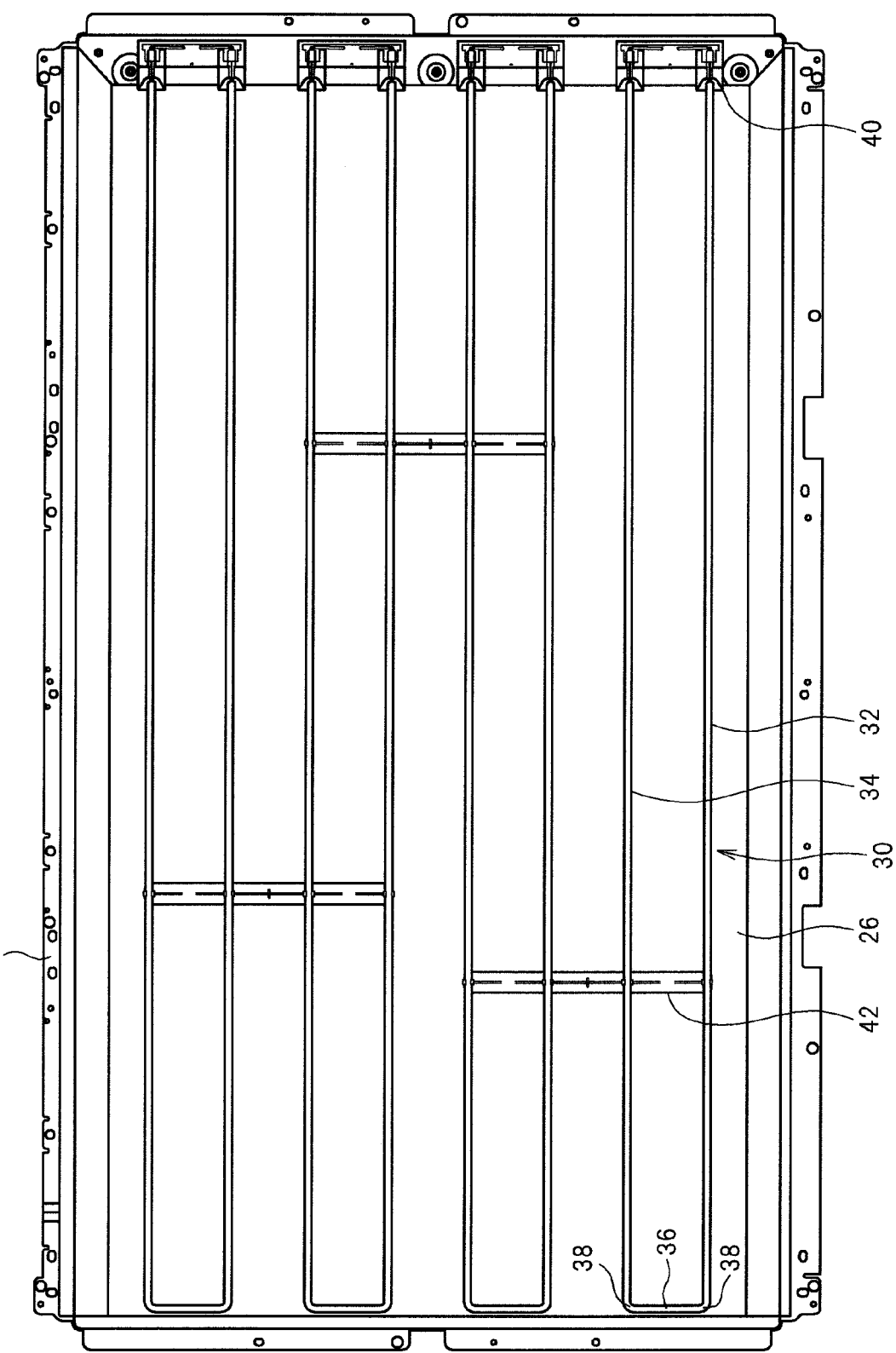
FIG. 4 is a plan view illustrating a structure in which an intermediate frame is further detached from the structure illustrated in FIG. 3.

FIG. 3 is a plan view illustrating a structure in which the upper frame 14, the liquid crystal display panel 10, the diffusion sheet 22, and the diffusion plate 24 are detached from the liquid crystal display device of FIG. 1. FIG. 4 is a plan view illustrating a structure in which the intermediate frame 18 is further detached from the structure illustrated in FIG. 3.

The liquid crystal display device includes a fluorescent tube 30 (for example, cold cathode fluorescent lamp) as illustrated in FIGS. 2, 3, and 4. The fluorescent tube 30 has gas (for example, inert gas such as neon-argon (Ne—Ar) gas) and mercury filled therein.

The fluorescent tube 30 is disposed on an upper side of the reflection sheet 26 (opposite to display surface 12 of the liquid crystal display panel 10). The fluorescent tube 30 includes a first linear portion 32 and a second linear portion 34, which are arranged in parallel with each other, and a connection portion 36 for connecting one end portion of the first linear portion 32 and one end portion of the second linear portion 34 (see FIG. 4). The connection portion 36 includes at least one curved portion 38 which is adjacent to the first linear portion 32 and the second linear portion 34. In the example illustrated in FIG. 4, the fluorescent tube 30 has two curved portions 38 to form a squared U-shape. Alternatively, however, the fluorescent tube 30 may have one curved portion 38 to form a U-shape.

Both end portions of the fluorescent tube 30, which include electrodes, are arranged adjacent to each other. The fluorescent tube 30 is retained by an electrode holder 40. Specifically, the electrode holder 40 retains the both end portions of the fluorescent tube 30, and is attached to the lower frame 28. The electrode holder 40 includes a guide groove for guiding a lead drawn from the end portions of the fluorescent tube to the rear surface of the lower frame 28. In addition, portions of the fluorescent tube 30 other than the both end portions are retained by an auxiliary holder 42. The auxiliary holder 42 includes a plurality of support portions for fixing several fluorescent tubes 30. The fluorescent tube 30 is retained by at least one auxiliary holder 42 between the end portions including electrodes and the curved portions 38 in a display area.

Figure 5:
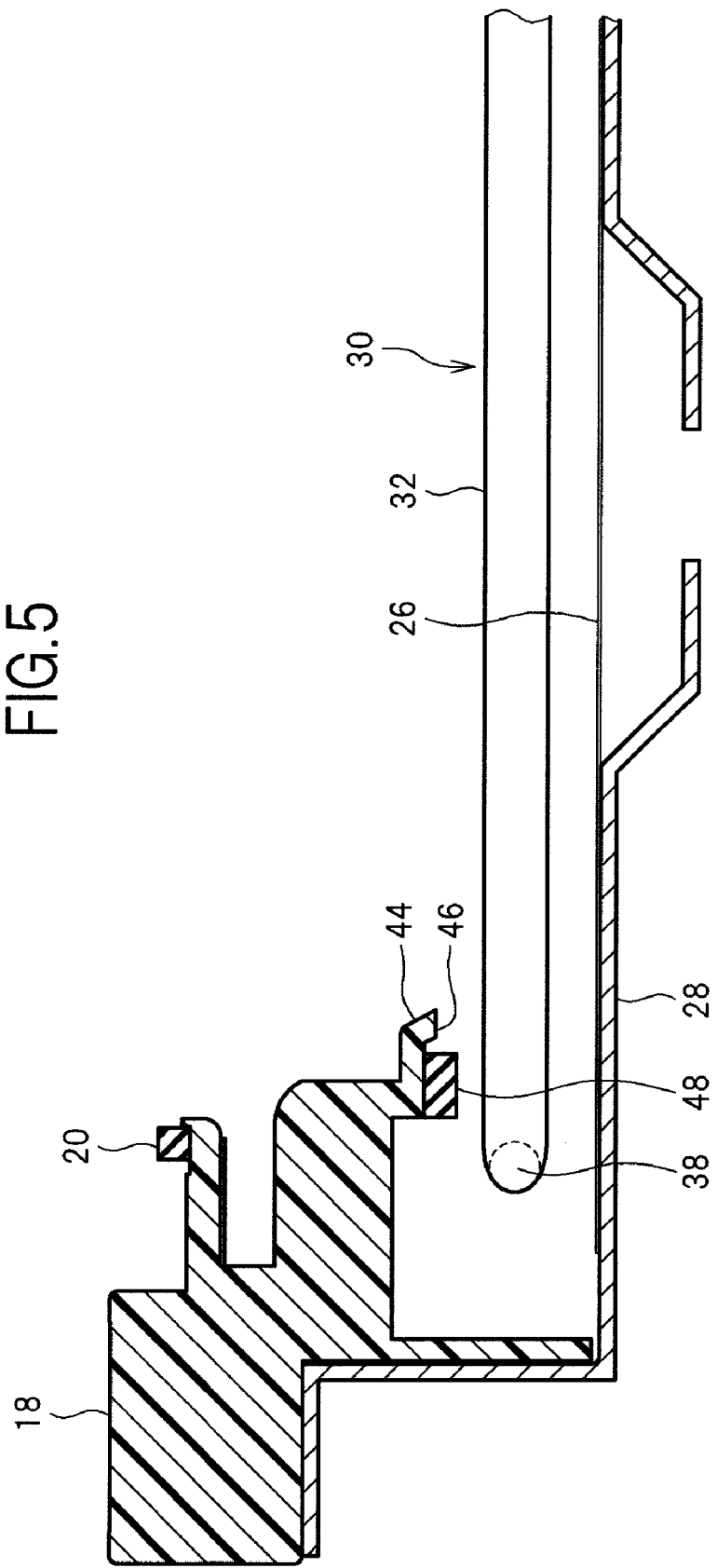
FIG. 5 is a cross sectional view taken along the line V-V of the structure illustrated in FIG. 3.

FIG. 5 is a cross sectional view taken along the line V-V of the structure illustrated in FIG. 3. FIG. 6 is a cross sectional view taken along the line VI-VI of the structure illustrated in FIG. 3.

The liquid crystal display device includes a light reflection cover 44. In this embodiment, the light reflection cover 44 is integrally formed with the intermediate frame 18 (or is part of intermediate frame 18). The light reflection covers 44 are disposed along a short direction of the liquid crystal display panel 10 so as to overlap the end portions of the fluorescent tube 30 on the electrode side and the curved portions 38 and the connection portion 36 of the fluorescent tube 30, respectively. The light reflection cover 44 and the intermediate frame 18 are formed of a white resin, and have a function of improving light use efficiency of the liquid crystal display panel 10 in the short direction.

The light reflection cover 44 has a hole or a notch 46 formed therein for allowing the fluorescent tube 30 to pass therethrough. Therefore, not only an upper portion but side portions of the fluorescent tube 30 disposed in the hole or the notch 46 are covered with the light reflection cover 44. In short, a part of the fluorescent tube 30 is covered with the light reflection cover 44.

Specifically, at the end portions of the fluorescent tube 30 on the electrode side, the electrode holder 40 is covered with the light reflection cover 44. Further, at the curved portion 38 of the fluorescent tube 30, the at least one (two in this embodiment) curved portion 38, the connection portion 36, a part of the first linear portion 32 (portion connected to curved portion 38), and a part of the second linear portion 34 (portion connected to curved portion 38) of the fluorescent tube 30 are covered with the light reflection cover 44.

In this embodiment, an elastic body 48 (for example, rubber) is disposed on the light reflection cover 44 on a side of the curved portion 38 of the fluorescent tube 30 so as to face the fluorescent tube 30 in a non-contact manner. The light reflection cover 44 has a step portion having a plane parallel with the lower frame 28, and the elastic body 48 is attached to the step portion. The step portion has a plurality of planes which are parallel with the lower frame 28, and the elastic body 48 is attached to a plane closest to the lower frame 28 among the plurality of planes. The elastic body 48 is formed of a material which is softer than the light reflection cover 44 (in this embodiment, part of intermediate frame 18). The elastic body 48 faces the part of the first linear portion 32 and the part of the second linear portion 34 of the fluorescent tube 30. However, the elastic body 48 does not face the connection portion 36 (in particular, curved portions 38) of the fluorescent tube 30. Stress is likely to concentrate on the curved portions 38, but because the elastic body 48 is located at a position not facing the curved portions 38, the elastic body 48 is not brought into contact with the curved portions 38.

According to this embodiment, the elastic body 48 is provided between the light reflection cover 44 and the fluorescent tube 30, and hence the fluorescent tube 30 may be prevented from being broken due to collision with the light reflection cover 44. The elastic body 48 is softer than the light reflection cover 44, and hence there is a low possibility of breakage of the fluorescent tube 30 even if the elastic body 48 collides with the fluorescent tube 30. Generally, vibration of the squared U-shaped fluorescent tube 30 is easily increased on the curved portion side, and hence, in many cases, an auxiliary holder is provided to fix the portion on the curved portion side. However, in this embodiment, the use of the auxiliary holder in the periphery of the curved portion may be omitted.

Further, the elastic body 48 and the fluorescent tube 30 are provided in a non-contact manner, and hence decrease in temperature in the periphery of the curved portions of the fluorescent tube 30 may be prevented. Therefore, it is possible to prevent generation of the temperature distribution in which temperature of the fluorescent tube 30 differs in different portions, and hence uniform light emission of the fluorescent tube 30 may be achieved.

The present invention is not limited to the embodiment described above, and various modifications may be made thereto. For example, the structure described in the embodiment may be replaced by a structure having substantially the same structure, a structure having the same action and effect, and a structure which may achieve the same object.

What is claimed is:

1. A liquid crystal display device, comprising:
   a liquid crystal display panel;
   a fluorescent tube disposed on a side opposite to a display surface of the liquid crystal display panel;
   a holder for retaining the fluorescent tube;
   a frame to which the holder is attached;
   a light reflection cover disposed between the liquid crystal display panel and the frame, the light reflection cover including one of a hole and a notch for allowing the fluorescent tube to pass therethrough, the light reflection cover covering a part of the fluorescent tube; and
   an elastic body provided on the light reflection cover so as to face the fluorescent tube in a non-contact manner.

2. The liquid crystal display device according to claim 1, wherein:
   the fluorescent tube includes:
      a first linear portion and a second linear portion arranged in parallel with each other; and
      a connection portion for connecting one end portion of the first linear portion and one end portion of the second linear portion;
   the connection portion includes at least one curved portion which is adjacent to the first linear portion and the second linear portion;
   the at least one curved portion, a part of the first linear portion, a part of the second linear portion, and the connection portion are covered with the light reflection cover; and
   the elastic body is located at a position facing the part of the first linear portion and the part of the second linear portion.

3. The liquid crystal display device according to claim 2, wherein the elastic body is disposed so as to avoid facing the at least one curved portion.

4. The liquid crystal display device according to claim 1, wherein:
   the light reflection cover includes a step portion having a plane in parallel with the frame; and
   the elastic body is attached to the step portion.

5. The liquid crystal display device according to claim 4, wherein:
   the step portion has a plurality of planes which are parallel to the frame; and
   the elastic body is attached to a plane of the plurality of planes, which is closest to the frame.

6. The liquid crystal display device according to claim 1, further comprising an intermediate frame disposed between the liquid crystal display panel and the frame, for disposing the liquid crystal display panel thereon,
   wherein the intermediate frame is integrally formed with the light reflection cover.

7. The liquid crystal display device according to claim 6, wherein the intermediate frame and the light reflection cover are both formed of a white resin.

8. The liquid crystal display device according to claim 1, wherein the elastic body is formed of a material softer than the light reflection cover.

* * * * *